(12) United States Patent
Chien et al.

(10) Patent No.: US 12,541,849 B2
(45) Date of Patent: Feb. 3, 2026

(54) CARDIAC CATHETERIZATION IMAGE RECOGNITION AND EVALUATION METHOD

(71) Applicant: Taiwan Association for Integration of Cardiology and Surgery, Taipei (TW)

(72) Inventors: Ting-Ying Chien, Taoyuan (TW); Hsiao-Huang Chang, Taipei (TW)

(73) Assignee: Taiwan Association for Integration of Cardiology and Surgery, Taipei (TW)

( * ) Notice: Subject to any disclaimer, the term of this patent is extended or adjusted under 35 U.S.C. 154(b) by 432 days.

(21) Appl. No.: 18/360,366

(22) Filed: Jul. 27, 2023

(65) Prior Publication Data

US 2024/0037741 A1 Feb. 1, 2024

(30) Foreign Application Priority Data

Jul. 27, 2022 (TW) .................................. 111128084

(51) Int. Cl.
| | |
|---|---|
| *G06T 7/00* | (2017.01) |
| *G06T 7/11* | (2017.01) |
| *G06T 7/70* | (2017.01) |
| *G06V 10/10* | (2022.01) |
| *G06V 10/764* | (2022.01) |
| *A61B 6/00* | (2024.01) |
| *A61B 6/50* | (2024.01) |

(52) U.S. Cl.
CPC ............. *G06T 7/0012* (2013.01); *G06T 7/11* (2017.01); *G06T 7/70* (2017.01); *G06V 10/16* (2022.01); *G06V 10/764* (2022.01); *A61B 6/481* (2013.01); *A61B 6/504* (2013.01); *G06T 2207/20081* (2013.01); *G06T 2207/20084* (2013.01); *G06T 2207/30021* (2013.01); *G06T 2207/30048* (2013.01); *G06T 2207/30108* (2013.01); *G06V 2201/03* (2022.01)

(58) Field of Classification Search
None
See application file for complete search history.

(56) References Cited

U.S. PATENT DOCUMENTS

| | | | | |
|---|---|---|---|---|
| 11,576,626 | B2 * | 2/2023 | Fonte ..................... | A61B 6/481 |
| 11,816,836 | B2 * | 11/2023 | Isgum ................... | G06N 3/0464 |
| 2023/0309943 | A1 * | 10/2023 | Van Walsum .......... | G16H 30/40 |
| | | | | 600/425 |
| 2023/0368398 | A1 * | 11/2023 | Figueroa-Alvarez ..... | G06T 5/70 |
| 2025/0117929 | A1 * | 4/2025 | Barve ................... | G06T 7/0012 |

* cited by examiner

*Primary Examiner* — Nancy Bitar
(74) *Attorney, Agent, or Firm* — Wang Law Firm, Inc.

(57) ABSTRACT

A cardiac catheterization image recognition and evaluation method is disclosed. The first deep learning algorithm is used to conduct an object recognition process on the cardiac catheterization image to obtain the vessel object image. The image processing process is conducted to the cardiac catheterization image to obtain the vessel location image. The vessel object image and the vessel location image are combined to obtain the vessel contour image. The vessel type judging process is conducted to the vessel contour image to determine the type of vessel in the cardiac catheterization image. The second deep learning algorithm is used on the vessel contour image to detect the vessel occlusion location and to judge the vessel occlusion rate. Based on the type of vessel and the vessel occlusion rate at the vessel occlusion location, the cardiac catheterization image is evaluated to obtain the SYNTAX Score.

9 Claims, 6 Drawing Sheets

CARDIAC CATHETERIZATION IMAGE RECOGNITION AND EVALUATION METHOD

CROSS-REFERENCE TO RELATED APPLICATION

This application claims the benefit from the Taiwan Patent Application No. 111128084, filed on Jul. 27, 2022, in the Taiwan Intellectual Property Office, the disclosure of which is hereby incorporated by reference in its entirety for all purposes.

BACKGROUND OF THE INVENTION

1. Field of the Invention

The present invention generally relates to a cardiac catheterization image recognition and evaluation method, and in particular, to the cardiac catheterization image recognition and evaluation method using deep learning algorithm to analyze the cardiac catheterization image to assist in obtaining the SYNTAX Score.

2. Description of the Related Art

Heart-related disease such as coronary heart disease is the second leading cause of death among the country. The main cause is that the inner layer of the artery wall of the coronary arteries is narrowed by fat accumulation, which makes the blood unable to pass through smoothly. The main function of the arteries is to supply blood to the myocardium, so that the myocardium can get enough oxygen. When the coronary artery is blocked, the lack of blood flow will cause the myocardium to lack oxygen and cause necrosis. In severe cases, it may lead to myocardial infarction and sudden death. The cardiac catheterization is currently the most accurate method for diagnosing coronary artery disease. During the inspection, a catheter is inserted into the coronary artery of the heart, and after injection of a contrast agent, the X-ray perspective is used to obtain a cardiac catheterization image, so as to check the blood flow status of the heart vessel, the lesion location and severity. According to the examination results, the doctor will choose the treatment plan, such as drug treatment, cardiac catheterization surgery (balloon dilatation, vascular stent placement), vascular bypass surgery, and so on.

The treatment methods used in the above different treatment plans have their own advantages and disadvantages. Doctors must decide the most favorable treatment method according to the status of the patient's arteries. For the judgment of the degree of vessel occlusion, the European and American cardiology associations recommend using the cardiac anatomy score (SYNTAX Score) to evaluate and to provide corresponding suggested treatment methods by the evaluation score. The calculation of the cardiac anatomy scores requires manual interpretation of cardiac catheterization images, judging the vessel type, finding out the location of the lesion and the degree of occlusion, and considering the patient's condition by the doctors. The interpretation of the cardiac catheterization images often consumes a lot of time for the doctors, resulting in the burden of human cost and it is difficult to improve the efficiency of the examination. In addition, the interpretation of X-ray images depends on the experience of the doctors. The same cardiovascular image may have different interpretation results due to different doctors, causing doubts about the accuracy of the examination results.

In summary, the conventional cardiac catheterization image recognition method still needs to consume manpower and time of the doctors and the accuracy of the interpretation results are difficult to be guaranteed. Hence, the present disclosure provides the cardiac catheterization image recognition and evaluation method to resolve the shortcomings of conventional technology and promote industrial practicability.

SUMMARY OF THE INVENTION

In view of the aforementioned technical problems, the primary objective of the present disclosure is to provide the cardiac catheterization image recognition and evaluation method, which are capable of solving the conventional problem that it is difficult to improve the efficiency of the cardiac catheterization image interpretation.

In accordance with one objective of the present disclosure, a cardiac catheterization image recognition and evaluation method is provided. The cardiac catheterization image recognition and evaluation method obtains a cardiac catheterization image of a patient by an input device, stores the cardiac catheterization image in a memory of a computing device, and accesses the memory by a processor of the computing device to conduct following steps: conducting an object recognition process on the cardiac catheterization image by a first deep learning algorithm to obtain a vessel object image of the cardiac catheterization image; conducting an image processing process to the cardiac catheterization image to obtain a vessel location image of the cardiac catheterization image; combining the vessel object image and the vessel location image to obtain a vessel contour image of the cardiac catheterization image; conducting a vessel type judging process to the vessel contour image to determine a vessel type in the cardiac catheterization image; detecting a vessel occlusion location by using a second deep learning algorithm on the vessel contour image and judging a vessel occlusion rate of the vessel occlusion location by an occlusion rate calculation process; and evaluating the cardiac catheterization image to obtain a cardiac anatomy score based on the vessel type and the vessel occlusion rate at the vessel occlusion location.

Preferably, the first deep learning algorithm may include U-Net model or YOLO v4 model, the first deep learning algorithm is used to recognize vessels, bones, catheter, diaphragm and heart of the cardiac catheterization image.

Preferably, the image processing process may include image preprocessing, vessel segmentation and voting mechanism.

Preferably, the image preprocessing may include contrast enhancement, image cutting and image smoothing.

Preferably, the vessel segmentation may include ridge detection, skeleton extraction, noise removal and superpixel segmentation.

Preferably, the voting mechanism may include overlapping a mask of the ridge detection with the superpixel segmentation and determining the vessel location image by weight voting.

Preferably, the vessel type may include right dominance and left dominance.

Preferably, the second deep learning algorithm may include Mask RCNN model and Bi-LSTM model, and after marking the vessel contour image, the vessel occlusion location is predicted by the second deep learning algorithm.

Preferably, a reference point of the vessel contour image may be found by tangent line and normal vector line, corresponding points on both sides of vessel may be obtained by a dynamic programming algorithm, and vessel width may be calculated by the corresponding points, so as to calculate the vessel occlusion rate.

Preferably, the cardiac anatomy score may be provided to medical personnel by an output device for judging vascular occlusion status.

As mentioned previously, the cardiac catheterization image recognition and evaluation method may have one or more advantages as follows.

1. The cardiac catheterization image recognition and evaluation method may obtain the vessel object image by the deep learning algorithm and obtain the vessel location image by the image processing process. The two images are combined to obtain the vessel contour image, so as to mark the contour and status of the vessels more accurately and to improve the accuracy of the subsequent analysis.
2. The cardiac catheterization image recognition and evaluation method may determine the vessel type by the deep learning algorithm, determine the vessel occlusion location and further calculate the vessel occlusion rate of the vessel occlusion location. The status of each vessel segment in the cardiac catheterization image is automatically interpreted, so as to assist in obtaining the information required for the cardiac anatomy score and to improve the efficiency of the evaluation.
3. The cardiac catheterization image recognition and evaluation method may the functions required in the analysis process by the computing device, and the evaluation results can be provided to the medical personnel through the output device, so as to provide the suggestions of the subsequent treatment for the medical personnel.

BRIEF DESCRIPTION OF THE DRAWINGS

The technical features, detail structures, advantages and effects of the present disclosure will be described in more details hereinafter with reference to the accompanying drawings that show various embodiments of the invention as follows.

DETAILED DESCRIPTION OF THE PREFERRED EMBODIMENTS

In order to facilitate the understanding of the technical features, the contents and the advantages of the present disclosure, and the effectiveness thereof that can be achieved, the present disclosure will be illustrated in detail below through embodiments with reference to the accompanying drawings. The diagrams used herein are merely intended to be schematic and auxiliary to the specification, but are not necessary to be true scale and precise to the configuration after implementing the present disclosure. Thus, it should not be interpreted in accordance with the scale and the configuration of the accompanying drawings to limit the scope of the present disclosure on the practical implementation.

Figure 1:
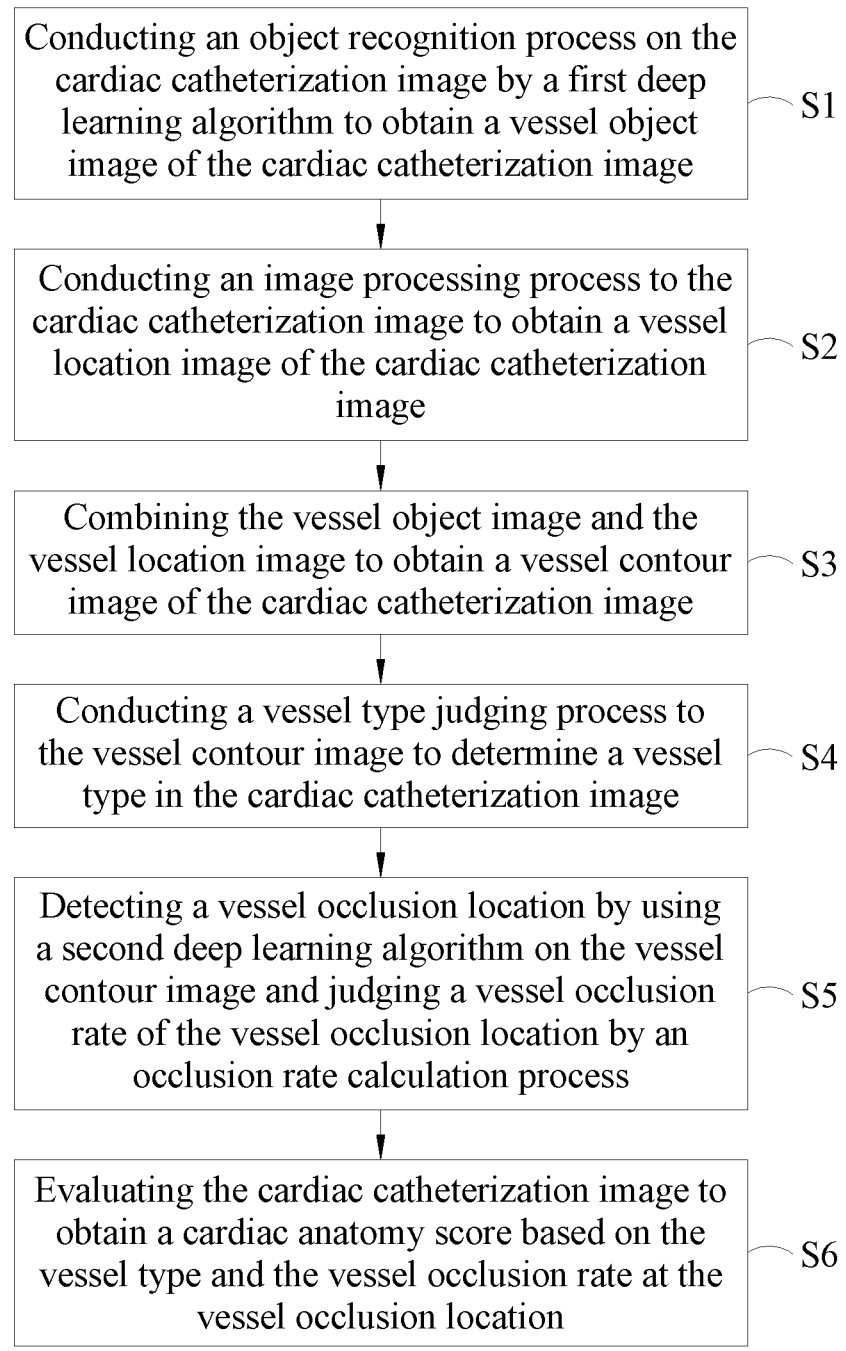
FIG. 1 is the flow chart of the cardiac catheterization image recognition and evaluation method in accordance with the embodiment of the present disclosure.

Please refer to FIG. 1, which is the flow chart of the cardiac catheterization image recognition and evaluation method in accordance with the embodiment of the present disclosure. When a patient undergoes cardiac catheterization, the doctor inserts the catheter into the coronary artery of the heart, injects the contrast agent, and takes the cardiac catheterization image through an X-ray machine. The cardiac catheterization image can be stored in the X-ray detection machine or in the connected input device, such as the servers of the hospital, the cloud databases, etc. The above-mentioned input device can be accessed by the physical line connection or by the network connection for obtaining the patient's cardiac catheterization image. The cardiac catheterization image is stored in the memory of the computing device, and then the processor of the computing device may access the memory to conduct the recognition and evaluation method. The computing device can be the server computer in the hospital, like the input device, or the cloud computing device. The computing device may also be the doctor's personal computer or handheld device. When the computing device accesses the cardiac catheterization image and executes the corresponding control program instructions, the cardiac catheterization image recognition and evaluation method as shown in the figure can be performed, wherein the cardiac catheterization image recognition and evaluation method includes the following steps (S1-S6).

Step S1: Conducting an object recognition process on the cardiac catheterization image by a first deep learning algorithm to obtain a vessel object image of the cardiac catheterization image. The cardiac catheterization images obtained through cardiac catheterization are gray-scale images of the X-ray angiogram (XRA), whose format complies with the Digital Imaging and Communications in Medicine (DICOM), including cardiac catheterization images information and images. For each examined patient, it may contain five sequence files, and each sequence file has about 60 to 80 images. The cardiac catheterization images are characterized by low contrast and a lot of background noise. If the original cardiac catheterization images are directly analyzed, it is difficult to find out the location of the vessels that need to be analyzed. Therefore, the recognition step firstly uses the first deep learning algorithm to conduct the object recognition process on the cardiac catheterization images. In the present embodiment, the cardiac catheterization images to be analyzed can be cardiac catheterization images of the patients provided by the hospital. The provided data are de-identified and are randomly selected to form the training set and the testing set at a ratio of 7:3. However, the data ratio disclosed in the present disclosure is not limited thereto. In other embodiments, the training set and the testing set can also be 6:4 or other ratios.

Figure 2:
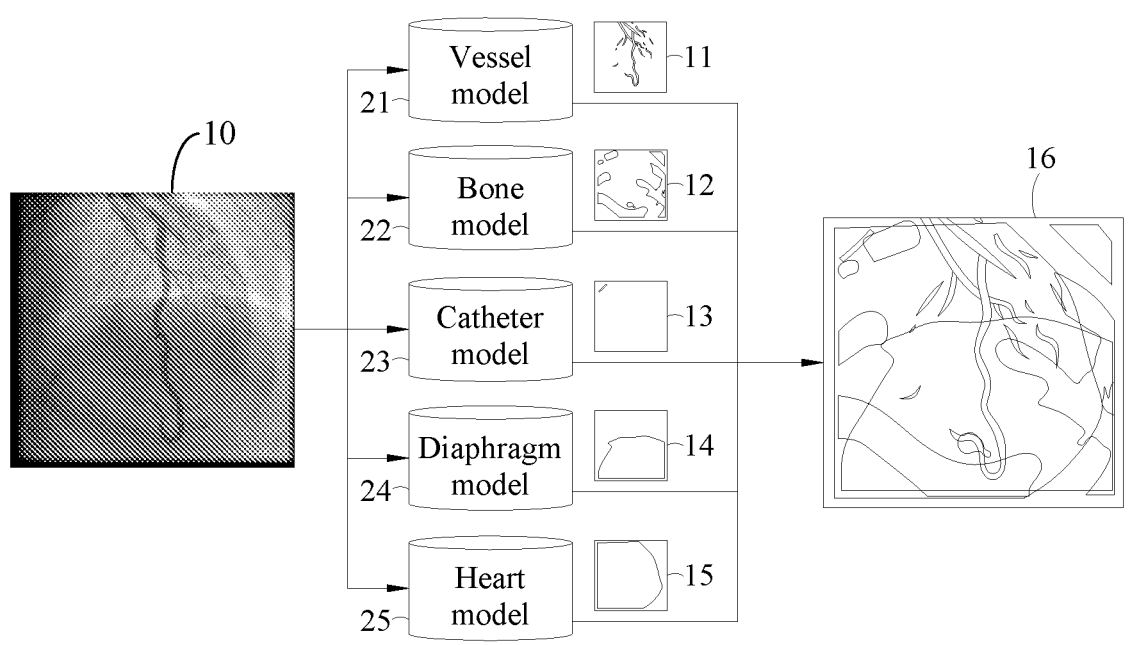
FIG. 2 is the schematic diagram of the object recognition process in accordance with the embodiment of the present disclosure.

Please also refer to FIG. 2, which is the schematic diagram of the object recognition process in accordance with the embodiment of the present disclosure. As shown in the figure, firstly, the cardiac catheterization image 10 may conduct image preprocessing to convert the original image into a JPEG file format that is easy to mark and may conduct the process of removing the frame and noise to prevent the black frame and noise of the original image from affecting the subsequent analysis results. Next, the process marks vessels, bones, catheters, diaphragm, and heart on the cardiac catheterization image 10, and then use the first deep learning algorithm to respectively establish a vessel model 21, a bone model 22, a catheter model 23, a diaphragm model 24, and a heart model 25. Each model is trained by the training set. After the images of the testing set are input into each model, vessel object image 11, bone object image 12, catheter object image 13, diaphragm object image 14, and heart object image 15 can be obtained. The above images can be combined to form a combined image 16.

In the present embodiment, the first deep learning algorithm can be the U-Net model. Before training with the U-Net model, the Labelme package can be used to mark the contours of the objects in the cardiac catheterization image 10 for forming the masks for vessels, bones, catheters, diaphragm and heart, and then bring them into the U-Net structure to build each model. The U-Net structure includes a shrinking path (encoder) and an expanding path (decoder). During the training process, the shrinking path conducts the subsampling to capture relevant information in the image background, and the expanding path conducts upsampling to assist the accurate positioning. At the same time, the feature map of the corresponding shrinking path is added to ensure the extraction of high-level features and low-level features. At the same time, images can be accurately segmented and each model can be established without requiring a large amount of training data.

In other embodiment, the first deep learning algorithm can be the YOLO v4 model. Before training with the YOLO v4 model, the LabelImg package can be used to mark the irregular contours of the objects in the cardiac catheterization image 10 with multiple rectangles. The masks for vessels, bones, catheters, diaphragm and heart are formed respectively and then bring them into the YOLO v4 structure to build each model. After the YOLO v4 structure inputs the image, the backbone is used to extract the features of the image. For example, the CSPDarknet53 model is used. The Path Aggregation Network (PAN) and Spatial pyramid pooling (SPP) are used in the neck part to integrate the feature maps of each layer, and finally conduct the prediction of the bounding box to establish each model.

In the present disclosure, the evaluation of the coronary arteries focuses on the vessel part. Therefore, in this step, various object models are established on the cardiac catheterization image 10 according to the first deep learning algorithm to conduct the object recognition process, and the vessel object image 11 corresponding to the cardiac catheterization image 10 is selected as one of the input images for the subsequent analysis and evaluation.

Step S2: Conducting an image processing process to the cardiac catheterization image to obtain a vessel location image of the cardiac catheterization image. In addition to obtaining the vessel object image 11 through the above object recognition method, for the cardiac catheterization image, the vessel location image can also be obtained through the image processing process. The image processing process can include image preprocessing, vessel segmentation and voting mechanism.

Figure 3:
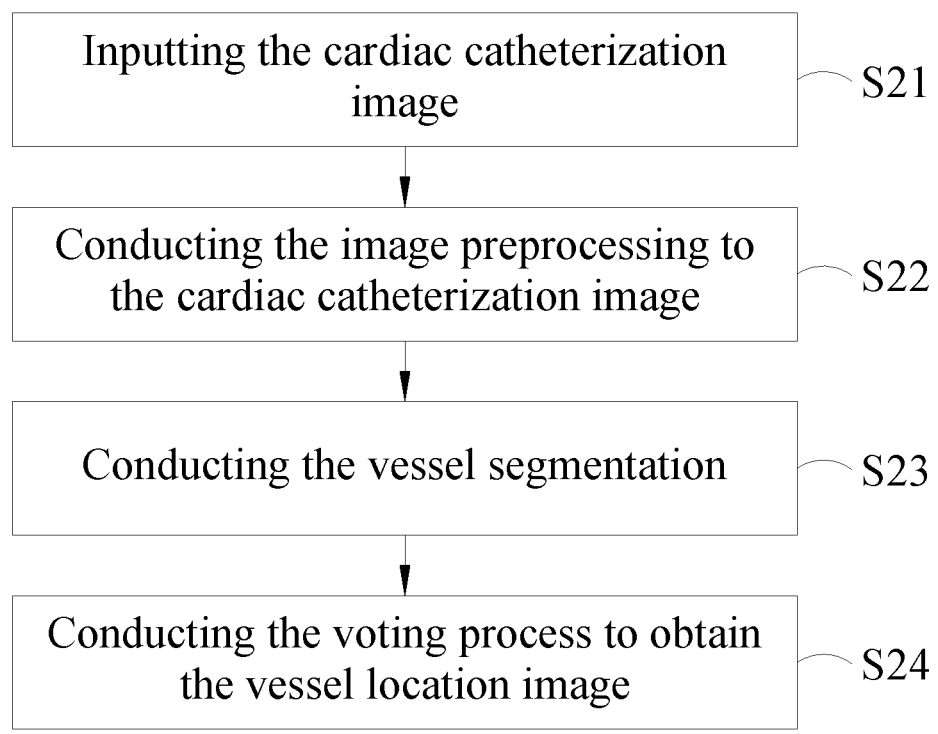
FIG. 3 is the flow chart of the image processing process in accordance with the embodiment of the present disclosure.

Please also refer to FIG. 3, which is flow chart of the image processing process in accordance with the embodiment of the present disclosure. As shown in FIG. 3, the image processing process includes the following steps (S21-S24).

Step S21: Inputting the cardiac catheterization image. As described in the previous step, the cardiac catheterization images obtained in the cardiac catheterization can be converted from the X-ray angiogram images to the JPEG format. The black border of the original image can be removed to obtain the input original image.

Step S22: Conducting the image preprocessing to the cardiac catheterization image. The image preprocessing process may include contrast enhancement process and image smoothing process. Firstly, the contrast enhancement process may use top-hat transform method and contrast limited adaptive histogram equalization (CLAHE) method. The top-hat transform method is a contrast enhancement method based on the mathematical morphology. The gap between the bright part and the dark part of the image is widened to become more polarized. The top-hat transform method mainly uses two types of operators including an opening operator and a closing operator. These two operators find out the bright and dark parts of an image respectively. Firstly, let f be the grayscale image and B be the structuring element, and let the erosion function f(x,y) be f⊕B and the dilation function be B(u, v), let I be the original image. The two formulas of the erosion function and the dilation function are defined in the following equations (1) and (2).

$$f \oplus B = \max_{u,v} (f(x-u, y-v) + B(u, v)) \qquad (1)$$

$$f \ominus B = \min_{u,v} (f(x+u, y+v) - B(u, v)) \qquad (2)$$

The opening operator and the closing operator can then be generated by exchanging the order using the erosion function and the dilation function, which are respectively denoted by f∘B and f●B in the following equations (3) and (4).

$$f \circ B = (f \ominus B) \oplus B \qquad (3)$$

$$f \bullet B = (f \oplus B) \ominus B \qquad (4)$$

The open operator and the close operator can be used to calculate the white top-hat (WTH) and black top-hat (BTH) in the image, which are respectively representing the bright part and the dark part of the image. The calculation formulas are shown in the following equations (5) and (6).

$$WTH(x, y) = f(x, y) - f \circ B(x, y) \qquad (5)$$

$$BTH(x, y) = f \bullet B(x, y) - f(x, y) \qquad (6)$$

Finally, the bright part $I_W$ of the original image and the dark part $I_B$ of the original image are adding and subtracting to obtain the contrast enhanced result $I_{CE}$, as shown in equation (7).

$$I_{CE} = I + I_W - I_B \qquad (7)$$

The contrast limited adaptive histogram equalization method is an adaptive histogram equalization algorithm, which may solve the problem of over-enhancing brightness in the whole area. The histogram shows the distribution of all pixel intensities in an image from 0 to 255. In the present embodiment, the intensities displayed in the histogram are the gray scale intensities. The contrast limited adaptive histogram equalization method divides the image into many small blocks and performs equalization process to each small block. However, the difference from the general adaptive histogram equalization is that the contrast limited adaptive histogram equalization method will do contrast limitation and linear interpolation to maintain the contrast continuity between the small blocks. The contrast limit may limit the height of the histogram, and once the height is exceeded, it is evenly distributed to the pixel intensity from 0 to 255 to ensure that the total area of the histogram remains unchanged.

After enhancing the contrast, the image smoothing process is then performed. In order to protect the boundary structure of the region of interest (ROI), the present embodiment uses a rolling guidance filter (RGF). The rolling guidance filter may ensure the accuracy of large-area object boundaries when removing and smoothing the complex small areas in the image. Therefore, the rolling guidance filter can be used to remove complex backgrounds, obtain the object contours, and conduct the image segmentation easily.

Step S23: Conducting the vessel segmentation. The vessel segmentation may include ridge detection, skeleton extraction, noise removal and superpixel segmentation. Regarding the ridge detection to the vessel, the Sato tubeness filter proposed by Sato et al. (Y. Sato et al., "3D multi-scale line filter for segmentation and visualization of curvilinear structures in medical images," in CVRMed-MRCAS'97, 1997, pp. 213-222: Springer) may be used for detection. This filter is often used to find continuous tubular features such as water pipes and rivers. The Hessian matrix is used to calculate the eigenvalues of the image to find the curved features, and then use the found vessel location features as a Vesselness Map. The blood vessel image still has a lot of noise, and the contour is not obvious. Thus, we set a grayscale threshold value to find the vessel location and filter out the possible background noise. The pixel intensity of the grayscale value below the threshold value is set to 0, and the pixels above the threshold value is set to 255. After binarization, the vesselness map including the vessel contour can be obtained, and then the Zhang-Suen thinning algorithm is used to extract the location of the vessel skeleton. The skeletons of the main blood vessels are all connected, but the noise white points in the background can be filtered in the next step.

The process of filtering noise is to find the connected components with the pixel group less than 100 in the vesselness map and obtain the vesselness map after filtering. The image is then divided into multiple superpixels and find out the exact pixel locations occupied by the vessels. The Superpixel is to divide the original pixel-level image into multiple regions through region division and these regions are called superpixels. Superpixels can reduce computational dimensions and aggregate the pixels with same feature. In the present embodiment, the following methods can be used for superpixel segmentation.

(1) Felzenszwalb algorithm: the image is segmented by a graph-based manner and is segmented with specific judgment criteria and greedy algorithm. In the time efficiency, it is almost a linear relationship presented with the graph and the edge number. This algorithm ignores details in high-variability regions and can find visually consistent regions that are highly affected by the local contrast.

(2) Simple Linear Iterative Clustering (SLIC) algorithm: the k-means classification is used in the five-dimensional color information space (L*, a*, b*, X-axis coordinates, Y-axis coordinates). By converting the color image into a five-dimensional feature vector of CIE L*A*B* color space and XY coordinates, and then using the five-dimensional feature vector of LABXY as the distance standard for k-means classification. The pixels are classified. This classification is fast and the generated superpixels are more compact.

(3) Quickshift algorithm: the LABXY five-dimensional vector space is used to calculate distance, and the hierarchical segmentation method is used to simultaneously calculate multi-scale cutting results, which is faster in speed.

(4) Watershed algorithm: the grayscale gradient image is used. The bright part area is deemed as the watershed segmentation area of the image, and the image is deemed as a landscape map. The pixels in the bright part area form the peak, and then submerge the mark down from the peak until the submerged marked area meets the peak.

Step S24: Conducting the voting process to obtain the vessel location image. The vesselness map obtained by the ridge detection is used as a mask to overlap the above four different superpixel segmentation results. The superpixels touched by the mask are selected, and a weight majority vote is performed for each pixel. The pixel judged as a blood vessel with more than half of the weight value and is included as one of the last blood vessel pixels. The result of the final weight majority vote is the vessel location and the vessel location image is obtained according to the location of the pixels.

Step S3: Combining the vessel object image and the vessel location image to obtain a vessel contour image of the cardiac catheterization image. The vessel object image obtained in step S1 and the vessel location image obtained by step S2 are combined. The best combination method is found by using the ground truth value. The vessel location and the contour are marked to obtain the vessel contour image, which is used as the input image for subsequent judgment of the vessel type and the vessel occlusion location.

Step S4: Conducting a vessel type judging process to the vessel contour image to determine a vessel type in the cardiac catheterization image. The patient's heart vessels can be divided into four segments, namely RCA, LMCA, LAD, and LCX. The node occlusion status of each vessel in different segment locations will affect the evaluation of cardiac anatomy scores. On the other hand, different patients may also have different blood vessel types, which can be divided into right dominance and left dominance. The different vessel types will have different vessel nodes. Therefore, when evaluating the cardiac anatomy score, it is necessary to confirm the vessel type first, and then evaluate the occlusion status according to the node location corresponding to the vessel type.

Figure 4:
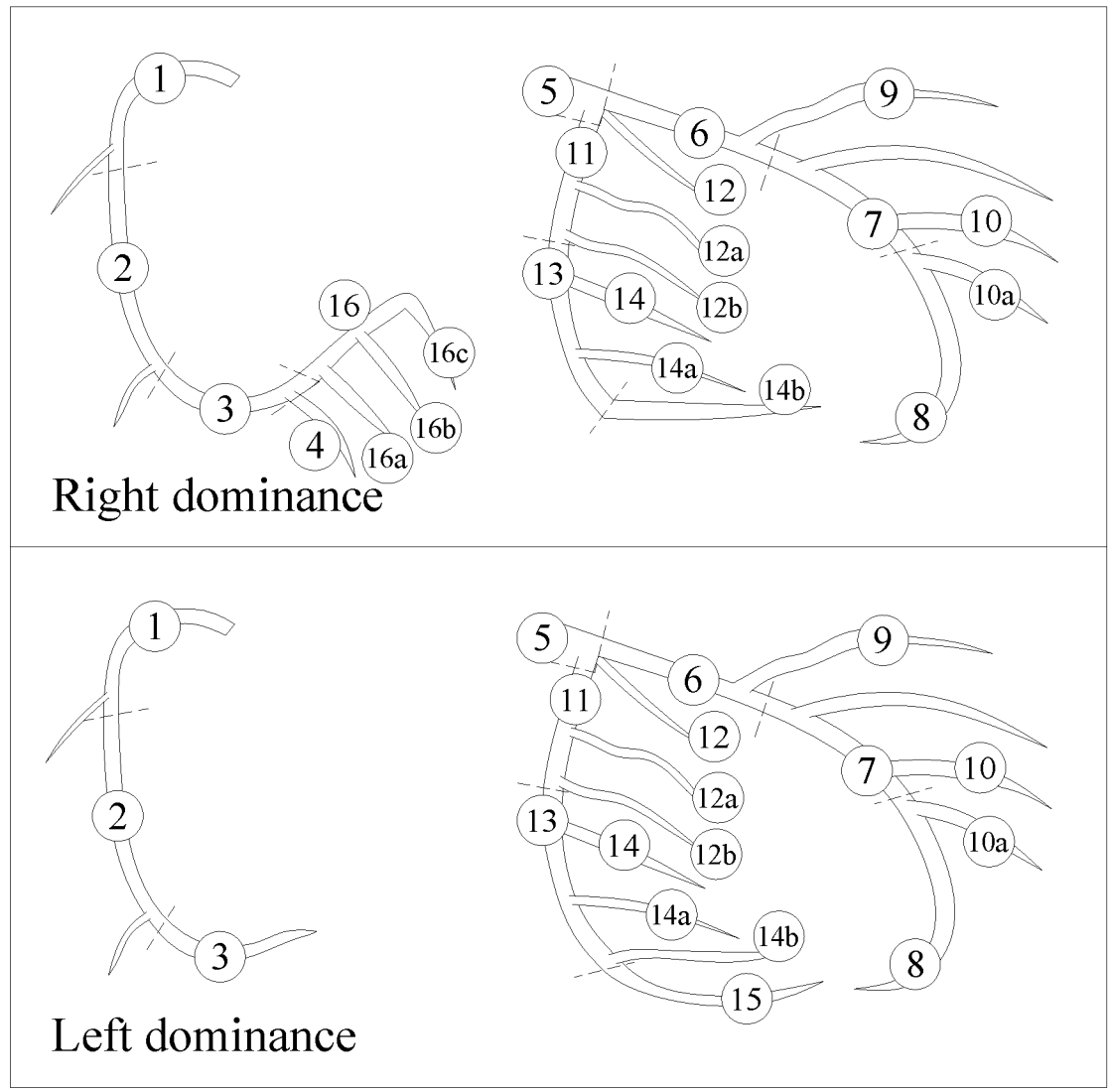
FIG. 4 is the schematic diagram of the vessel type in accordance with the embodiment of the present disclosure.

Please refer to FIG. 4, which is the schematic diagram of the vessel type in accordance with the embodiment of the present disclosure. The vessel types can be divided into right dominance and left dominance, and the numbers in the figures are the codes of each segment node. In terms of each segment location, the RCA segment includes segments 1, 2, 3, 4, 16, 16a, 16b, and 16c (only the right dominance type has segments 4, 16, 16a, 16b, and 16c), the LMCA segment includes segment 5, the LAD segment includes segment 6, 7, 8, 9, 9a, 10, 10a, and the LCX segment includes segment 11, 12, 12a, 12b, 13, 14, 14a, 14b, 15 (of which only the left-dominant type has segment 15). According to whether there are blood vessels in different segments of the vessel contour image, it can be judged whether the patient belongs to the right dominance or the left dominance, and then the vessel occlusion status can be judged.

Step S5: Detecting a vessel occlusion location by using a second deep learning algorithm on the vessel contour image and judging a vessel occlusion rate of the vessel occlusion location by an occlusion rate calculation process. In the present embodiment, the X-ray angiogram image is a continuous image that includes a time sequence. After each image is processed through the aforementioned steps for obtaining the vessel contour image. To detect the vessel occlusion location, the training data is marked first. The marking method can be marked with a rectangular LabelImg kit or an irregular-shaped Labelme kit, and then a second deep learning algorithm is performed to establish the calculation model for predicting the vessel occlusion location. In other embodiments, the vessel contour image can be increased by data enhancement technology to improve the training effect. For example, the input image is rotated in three directions of 90°, 180°, and 270°, or mapped in the horizontal and vertical directions, and the increased image can be used as the training data.

Figure 5:
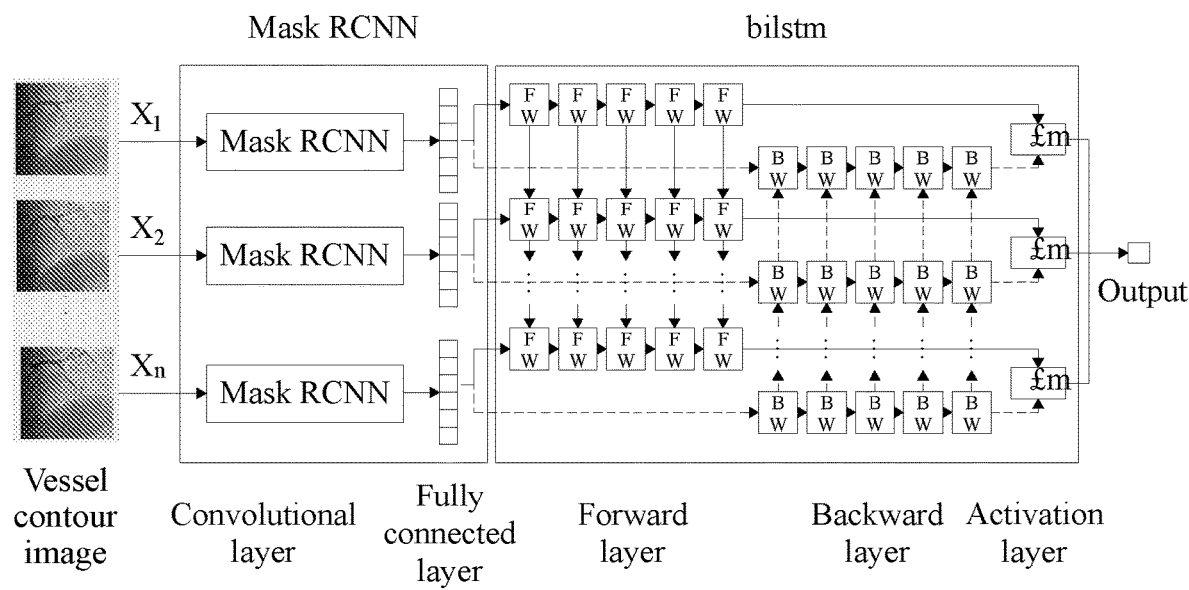
FIG. 5 is the schematic diagram of the vessel occlusion location detecting method in accordance with the embodiment of the present disclosure.

Please refer to FIG. 5, which is the schematic diagram of the vessel occlusion location detecting method in accordance with the embodiment of the present disclosure. As shown in the figure, the cardiac catheterization images are continuous images. In order to deal with the spatiality of the data (processing single image information) and temporality (processing continuous image information), the second deep learning algorithm disclosed in the present disclosure uses a multi-level deep learning architecture for modeling. That is, the Mask RCNN (spatial) and the Bidirectional Long Short-Term Memory (Bi-LSTM) (time) deep learning algorithms are combined. First, the vessel contour image is used as the input image, and the fully connected layer structure is generated through the convolutional layer calculation, and then the Bi-LSTM is used to build the model, the output image is generated after passing the forward layer, the backward layer and the activation layer respectively.

The LSTM is a time recursion neural network, which is suitable for predicting time-series data, and at the same time allows the data to maintain the timeliness. Using this structure may refer the before and after image information at the same time, it makes the analysis more informative. The LSTM is mainly composed of four components, which are input gate, output gate, forget gate, and memory cell. The input gate, the output gate and the memory cell are used to control the information flow. The input gate controls whether to input the read value, and judges whether the information can pass through the weight and information strength. These weight values will be learned and adjusted in the tour network, and then the information is stored in the memory cell. The forget gate is used to control how much temporarily stored information to be cleared, and the output gate is used to control how many calculated values to be output. The Bi-LSTM structure reduces the dimensionality of the input value and transforms it to the projection layer through the projection matrix and the bias vector. In the hidden layer, the Bi-LSTM adopts forward gated and backward gated learning methods, and finally outputs the output image of the prediction result.

Further, the input data attribute is expressed as an n-dimensional vector $X_t$=Input(t)

Wherein Input(t) represents all the data collected at the tth time, and $X_t \in R^n$. Then transform $X_t$ through the projection matrix and the bias vector to obtain a lower-dimensional vector $X'_t = W_{pr} X_t + b_{pr}$, where $W_{pr}$ is the projection matrix and bpr is the bias vector. And take $X'_t$ as the input value and send it to the hidden layer. In the hidden layer, the LSTM activation vector ht is calculated using LSTM bits, as shown in the following formula (8) to formula (12).

$$i_t = \sigma(W_{xi} X'_t + W_{hi} h_{t-1} + b_i) \quad (8)$$

$$f_t = \sigma(W_{xf} X'_t + W_{hf} h_{t-1} + b_f) \quad (9)$$

$$c_t = f_t c_{t-1} + i_t \tan h(W_{xc} X'_t + W_{hc} h_{t-1} + b_c) \quad (10)$$

$$o_t = \sigma(W_{xo} X'_t + W_{ho} h_{t-1} + b_o) \quad (11)$$

$$h_t = o_t \tan h\,(ct) \quad (12)$$

Wherein σ is a sigmoid function, and $i_t$, $f_t$, $c_t$, and $o_t$ respectively represent the input gate, the forgetting gate, the output gate, and the cell activation vectors at the tth time. The output value $y_t = \sigma(W_{hA} h_t + b_A)$ at the last tth second is the final output value. Wherein $W_{hA}$ is the projection matrix and $b_A$ is the bias vector. Further modify the Bi-LSTM calculation formula as shown in the following formula (13) to formula (15).

$$\left( \overrightarrow{h_t}, \overrightarrow{c_t}, \overrightarrow{f_t}, \overrightarrow{o_t} \right) = LSTM\left(x_t, \overrightarrow{h_{t-1}}, \overrightarrow{c_{t-1}}, \overrightarrow{f_{t-1}}, \overrightarrow{o_{t-1}}\right) \quad (13)$$

$$\left( \overleftarrow{h_t}, \overleftarrow{c_t}, \overleftarrow{f_t}, \overleftarrow{o_t} \right) = LSTM\left(x_t, \overleftarrow{h_{t-1}}, \overleftarrow{c_{t-1}}, \overleftarrow{f_{t-1}}, \overleftarrow{o_{t-1}}\right) \quad (14)$$

$$y_t = \sigma\left(W_{hA}\left[\overrightarrow{h_t}, \overleftarrow{h_t}\right] + b_A\right) \quad (15)$$

Wherein $\overrightarrow{h_t}$ represents the forward gate operation, and $\overleftarrow{h_t}$ represents the backward gate operation.

The above model can be used to predict the location of vessel occlusion in the vessel contour image, which can correspond to the location of each segment such as RCA, LMCA, LAD, and LCX, as well as the location of more detailed nodes in each segment, and then it can be known whether the patient's vessels are blocked in each segment. After finding the occlusion location, the status of the vessel occlusion is further judged by the occlusion rate calculation process. The occlusion rate calculation process first uses the tangent line and normal vector line to find the reference point of the vessel, then uses the dynamic programming algorithm to find the corresponding points on both sides of the vessel, and finally finds the thickest and thinnest locations of the vessel according to the corresponding points and calculates the occlusion rate. Wherein, the dynamic programming algorithm is shown in the formulas (16) and (17), and the calculation of the occlusion rate is shown in the formula (18).

$$S(i, j) = \min \begin{cases} S(i-1, j-1) + w(a_i, b_j) \\ S(i-1, j) + w(a_i, -) \\ S(i, j-1) + w(-, b_j) \end{cases} \quad (16)$$

$$w(a_i, b_j) = \sqrt{(a_x - b_x)^2 + (a_y - b_y)^2} \quad (17)$$

Wherein $a_i$, $b_j$ represent the sequence position on both sides of the vessel, - represents the point not corresponding to, calculate the distance between the corresponding points, find out the maximum and minimum distance between the paired points, and then calculate the vessel occlusion rate by the following formula (18).

$$\text{occlusion rate} = \left(1 - \frac{\text{Minimum width}}{\text{thickest width}}\right) \times 100\% \quad (18)$$

Step S6: evaluating the cardiac catheterization image to obtain a cardiac anatomy score based on the vessel type and the vessel occlusion rate at the vessel occlusion location.

When the vessel type and the vessel occlusion location and the vessel occlusion rate corresponding to this vessel type are obtained, the score of each segment can be automatically filled in to assist the medical staff to obtain the patient's cardiac anatomy score.

The calculation method of the cardiac anatomy score is illustrated as follows.

(1) For each vessel with a diameter exceeding 1.5 mm, if the occlusion rate exceeds 50%, it must be evaluated.
(2) If the continuous stenosis position is less than 3 vessel reference diameters, it is regarded as a single lesion, otherwise it is regarded as an independent lesion. The different locations are evaluated.
(3) The cardiovascular structure of the patients is divided into right dominance and left dominance and select one of them for calculating the cardiac anatomy score (SYNTAX Score).
(4) Whether there is a complete blockage.
(5) Trifurcation condition: the main vessel is divided into three vascular branches of at least 1.5 mm in length, and only segments 3/4/16/16a, 5/6/11/12, 11/12a/12b/13, 6/7/9/9a, 7/8/10/10a are considered.
(6) Bifurcation condition: branches are divided into two vascular branches of at least 1.5 mm in length, and only segments 5/6/11, 6/7/9, 7/8/10, 11/13/12a, 13/14/14a, 3/4/16, 13/14/15 are considered.
(7) Aorto ostial condition: when the lesion is located within 3 mm from the starting point of the aortic coronary vessel, the lesion is classified as an aorto ostial lesion.
(8) Severe detours condition: there is more than one vessel turn with the turning angle exceeding 90° or more than 3 vessel turns with the turning angle between 45° to 90° near the lesion.
(9) Length exceeding 20 mm: continuous lesion location exceeding 20 mm.
(10) Severe calcification: whether the vessel has severe calcification condition.
(11) Thrombus: whether there is thrombus condition in the vessel.
(12) Diffuse disease: whether there is diffuse disease condition.

After the patient's cardiac catheterization image conducts the above recognition and evaluation processes, the vessel type and the location of the vessel occlusion segment corresponding to the vessel type can be obtained, and the vessel occlusion rate at the occlusion location can be calculated, which can effectively assist the above judgment step to obtain the evaluation result, provide medical staff with a quick understanding of the patient's cardiac anatomy score, and then provide reference information for doctors to decide how to conduct the treatment.

Figure 6:
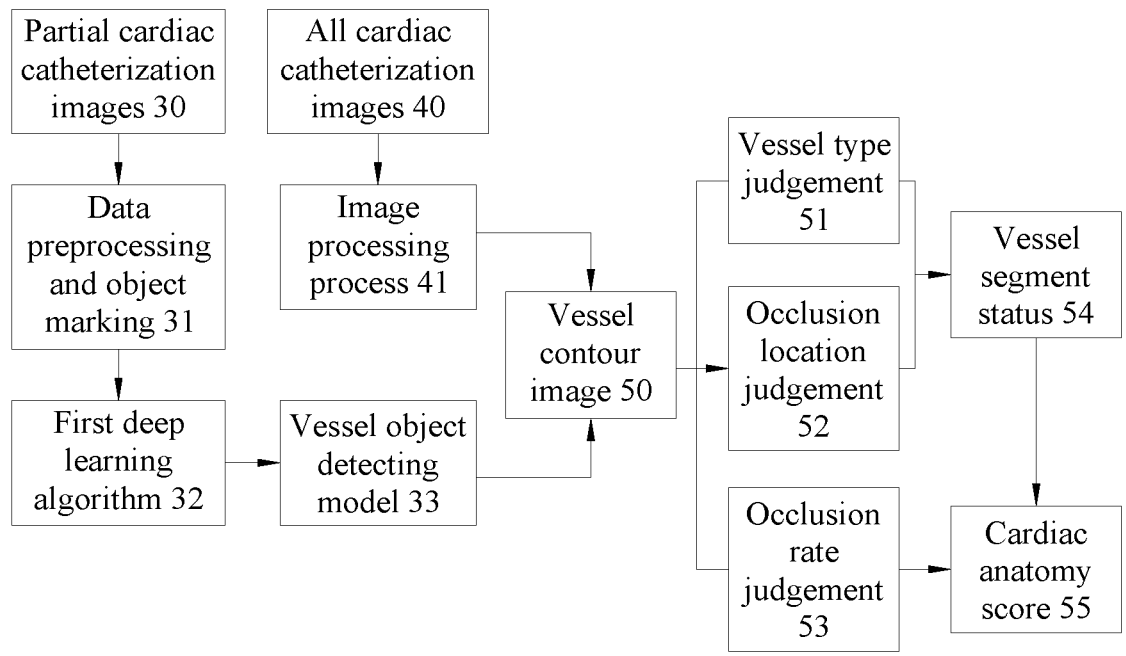
FIG. 6 is the system structure diagram of the cardiac catheterization image recognition and evaluation method in accordance with the embodiment of the present disclosure.

Please refer to FIG. 6, which is the system structure diagram of the cardiac catheterization image recognition and evaluation method in accordance with the embodiment of the present disclosure. As shown in the figure, the cardiac catheterization images can be divided into two parts: training and testing. The partial cardiac catheterization images 30 used for testing can undergo preliminary processing procedures by data preprocessing and object marking 31, such as converting file formats, removing borders to obtain images with required sizes, etc. The vessels are marked by the marking kit programs, and then building object recognition models by the first deep learning algorithm 32. As described in the previous embodiments, the first deep learning algorithm 32 may include a U-Net model or a YOLO v4 model, and the first deep learning algorithm 32 can establish a model for identifying vessels, bones, catheters, diaphragm, and heart in the cardiac catheterization image. In the present embodiment, the vessel object detecting model 33 is the primary used model, and the vessel object image is obtained by the vessel object detecting model 33.

On the other hand, all cardiac catheterization images 40 may conduct image recognition by the image processing process 41, and the location of the vessels can be found through the image preprocessing, vessel segmentation and voting mechanism, so as to obtain the vessel location image. For the image processing process, please refer to the foregoing embodiments, and the same content will not be described repeatedly. The vessel location image obtained by the image processing process 41 and the vessel object image obtained by the vessel object detecting model 33 are combined to obtain a vessel contour image 50. The vessel contour image 50 is used as an input image for analyzing vessel types and occlusion status.

The vessel contour image 50 can be used for vessel type judgement 51 and occlusion location judgement 52 through the second deep learning algorithm. After marking the vessel contour image 50, the location of each segment of the vessel is predicted through the second deep learning algorithm including the Mask RCNN model and the Bi-LSTM model. The vessel type judgment 51 is conducted and the occlusion location judgement 52 is conducted to predict whether there is a vessel occlusion in each segment. The vessel segment status 54 is obtained through the above information. At the same time, at the vessel occlusion location, the occlusion rate judgment 53 is conducted by the occlusion rate calculation process to obtain the occlusion status of each occlusion location. Based on the results of the vessel segment state 54 and the occlusion rate judgment 53, the information required for the calculation of the cardiac anatomy score 55 is provided. Finally, the cardiac anatomy score 55 is provided to assist the medical personnel in judging the degree of the vessel occlusion and deciding the means of treatment.

The above partial cardiac catheterization images 30 and all cardiac catheterization images 40 can be input by an input device and stored in a memory of a computing device. A processor may access the memory to perform recognition and evaluation methods, that is, the above recognition and evaluation procedures. The computing device and the input device may be a hospital server computer, a cloud computing device, or a doctor's personal computer, a handheld device, and the like. After obtaining the cardiac anatomical score 55 in the above recognition and evaluation program, it can be used as a reference for the medical personnel by an output device. The output device can be an output interface of a computing device, including a display, a screen, etc. The medical personnel can obtain the recognition and evaluation results through the output device, and then effectively judge the patient's cardiovascular status.

The present disclosure disclosed herein has been described by means of specific embodiments. However, numerous modifications, variations and enhancements can be made thereto without departing from the spirit and scope of the disclosure set forth in the claims.

What is claimed is:

1. A cardiac catheterization image recognition and evaluation method comprising:
obtaining a cardiac catheterization image of a patient by an input device,
storing the cardiac catheterization image in a memory of a computing device,
accessing the memory by a processor of the computing device conducting an object recognition process on the cardiac catheterization image by a first deep learning algorithm to obtain a vessel object image of the cardiac catheterization image;

conducting an image processing process to the cardiac catheterization image to obtain a vessel location image of the cardiac catheterization image;

combining the vessel object image and the vessel location image to obtain a vessel contour image of the cardiac catheterization image;

conducting a vessel type judging process to the vessel contour image to determine a vessel type in the cardiac catheterization image;

detecting a vessel occlusion location by using a second deep learning algorithm on the vessel contour image and judging a vessel occlusion rate of the vessel occlusion location by an occlusion rate calculation process;

and evaluating the cardiac catheterization image to obtain a cardiac anatomy score based on the vessel type and the vessel occlusion rate at the vessel occlusion location, wherein the cardiac anatomy score is provided to medical personnel by an output device for judging vascular occlusion status.

2. The cardiac catheterization image recognition and evaluation method of claim 1, wherein the first deep learning algorithm comprises U-Net model or YOLO v4 model, the first deep learning algorithm is used to recognize vessels, bones, catheter, diaphragm and heart of the cardiac catheterization image.

3. The cardiac catheterization image recognition and evaluation method of claim 1, wherein the image processing process comprises image preprocessing, vessel segmentation and voting mechanism.

4. The cardiac catheterization image recognition and evaluation method of claim 3, wherein the image preprocessing comprises contrast enhancement, image cutting and image smoothing.

5. The cardiac catheterization image recognition and evaluation method of claim 3, wherein the vessel segmentation comprises ridge detection, skeleton extraction, noise removal and superpixel segmentation.

6. The cardiac catheterization image recognition and evaluation method of claim 5, wherein the voting mechanism comprises overlapping a mask of the ridge detection with the superpixel segmentation and determining the vessel location image by weight voting.

7. The cardiac catheterization image recognition and evaluation method of claim 1, wherein the vessel type comprises right dominance and left dominance.

8. The cardiac catheterization image recognition and evaluation method of claim 1, wherein the second deep learning algorithm comprises Mask RCNN model and Bi-LSTM model, and after marking the vessel contour image, the vessel occlusion location is predicted by the second deep learning algorithm.

9. The cardiac catheterization image recognition and evaluation method of claim 1, wherein a reference point of the vessel contour image is found by tangent line and normal vector line, corresponding points on both sides of vessel are obtained by a dynamic programming algorithm, and vessel width is calculated by the corresponding points, so as to calculates the vessel occlusion rate.

* * * * *